US012728921B2

(12) United States Patent
Oniwa

(10) Patent No.: US 12,728,921 B2
(45) Date of Patent: Sep. 8, 2026

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventor: Yoshihiro Oniwa, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 57 days.

(21) Appl. No.: 18/894,411

(22) Filed: Sep. 24, 2024

(65) Prior Publication Data

US 2025/0108861 A1 Apr. 3, 2025

(30) Foreign Application Priority Data

Sep. 29, 2023 (JP) ................................ 2023-169195

(51) Int. Cl.
*B62D 15/02* (2006.01)

(52) U.S. Cl.
CPC ................................ *B62D 15/0265* (2013.01)

(58) Field of Classification Search
CPC ...... B62D 15/0265; B62D 1/00; B62D 15/00; B62D 15/025
See application file for complete search history.

(56) References Cited

U.S. PATENT DOCUMENTS 10,953,872 B2 * 3/2021 Park ...................... B60W 30/09
11,608,067 B2 * 3/2023 Xu ........................ B60W 40/06
2018/0281848 A1 * 10/2018 Zegelaar .............. B62D 15/024
2020/0047749 A1 * 2/2020 Morotomi ............. B60W 30/09
2020/0086856 A1 * 3/2020 Park ...................... B60W 30/09
2020/0346644 A1 * 11/2020 Schmeichel .......... B60W 50/14
2021/0094575 A1 * 4/2021 Sato ...................... B60W 30/16
2021/0179093 A1 * 6/2021 Miyamoto ............ B60W 30/12
2022/0009522 A1 * 1/2022 Zhang .................... B60W 30/12
2022/0017080 A1 * 1/2022 Moriya ................. B60W 10/20
2022/0135129 A1 5/2022 Oniwa
(Continued)

FOREIGN PATENT DOCUMENTS

JP 10-250614 9/1998
JP 2018-012473 1/2018
(Continued)

OTHER PUBLICATIONS

Japanese Office Action for Japanese Patent Application No. 2023-169195 dated Jun. 3, 2025.

*Primary Examiner* — Long T Tran
(74) *Attorney, Agent, or Firm* — Amin, Turocy & Watson, LLP

(57) ABSTRACT

A vehicle control device of an embodiment includes a recognizer that recognizes a surrounding situation of a host vehicle, a driving state detector that detects a driving state including steering of an occupant of the host vehicle, a driving controller that executes steering control for supporting steering of the occupant when there is a probability that the host vehicle will come into contact with a surrounding obstacle on the basis of recognition results of the recognizer and steering of the occupant equal to or larger than a predetermined value has been detected by the driving state detector, and a limiter that adjusts a limit value related to steering of the occupant in accordance with a steering state of the occupant.

7 Claims, 6 Drawing Sheets

(56) References Cited

U.S. PATENT DOCUMENTS

| | | | | |
|---|---|---|---|---|
| 2022/0227361 | A1* | 7/2022 | Hashimoto | B60W 10/184 |
| 2023/0278551 | A1* | 9/2023 | Fukuchi | B60W 30/0956 |
| 2023/0322208 | A1* | 10/2023 | Rojas | B60W 50/085 |
| | | | | 701/41 |

FOREIGN PATENT DOCUMENTS

| | | |
|---|---|---|
| JP | 2020-026207 | 2/2020 |
| JP | 2022-072326 | 5/2022 |

* cited by examiner

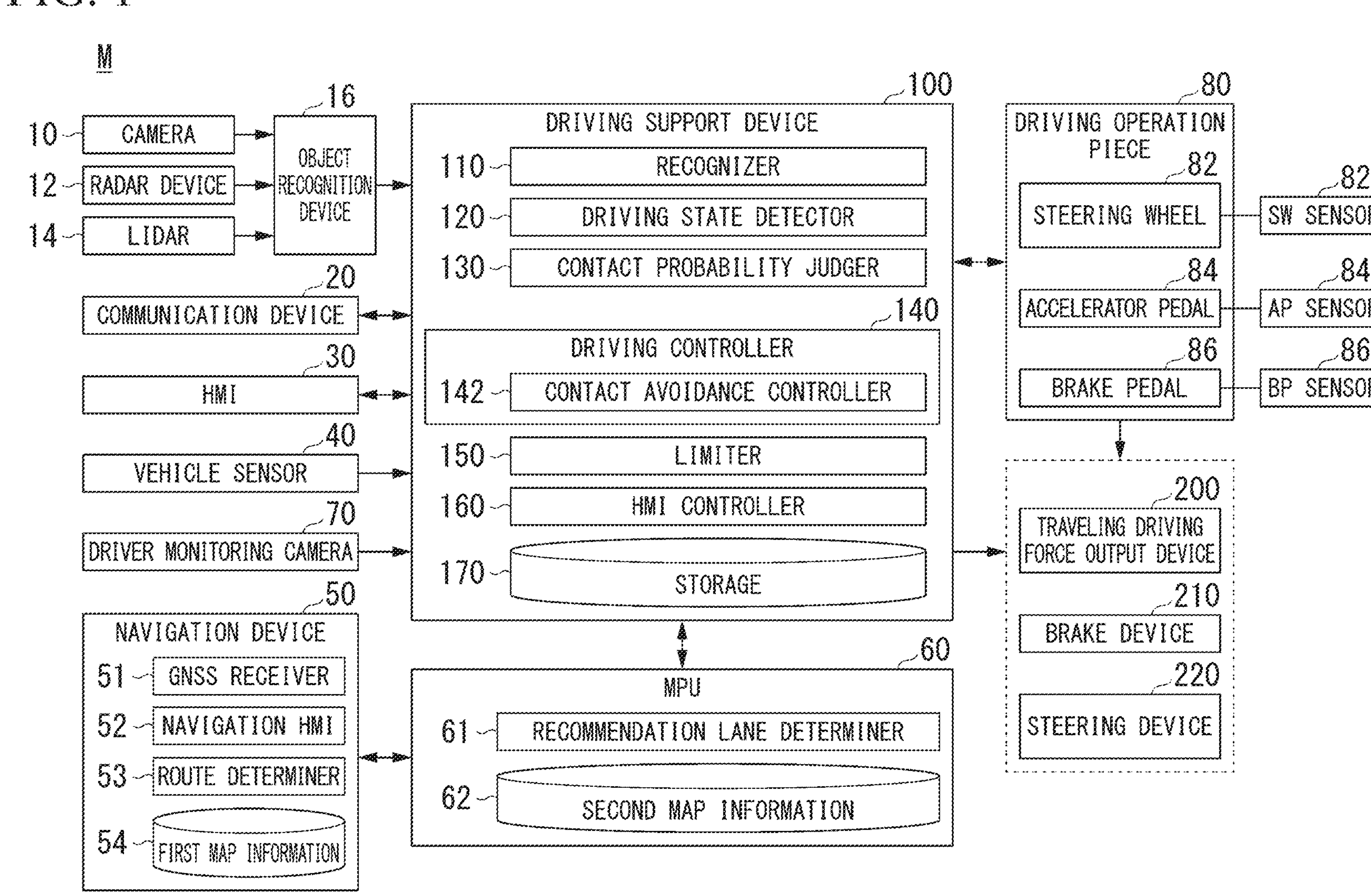
FIG. 1
M
10 CAMERA
12 RADAR DEVICE
14 LIDAR
16 OBJECT RECOGNITION DEVICE
20 COMMUNICATION DEVICE
30 HMI
40 VEHICLE SENSOR
70 DRIVER MONITORING CAMERA
50 NAVIGATION DEVICE
51 GNSS RECEIVER
52 NAVIGATION HMI
53 ROUTE DETERMINER
54 FIRST MAP INFORMATION
100 DRIVING SUPPORT DEVICE
110 RECOGNIZER
120 DRIVING STATE DETECTOR
130 CONTACT PROBABILITY JUDGER
140 DRIVING CONTROLLER
142 CONTACT AVOIDANCE CONTROLLER
150 LIMITER
160 HMI CONTROLLER
170 STORAGE
60 MPU
61 RECOMMENDATION LANE DETERMINER
62 SECOND MAP INFORMATION
80 DRIVING OPERATION PIECE
82 STEERING WHEEL
84 ACCELERATOR PEDAL
86 BRAKE PEDAL
82A SW SENSOR
84A AP SENSOR
86A BP SENSOR
200 TRAVELING DRIVING FORCE OUTPUT DEVICE
210 BRAKE DEVICE
220 STEERING DEVICE Z
X
Y
M
VM
82
m1
Vm1
DL1
DL2
DL3
L1
L2
L3
Vm2
m2
NOT OPERATING STATE
STEERING BEING PERFORMED
DRIVER'S STATE
NOT OPERATING STATE
DRIVING SUPPORT DEVICE
ALARM
STEERING CONTROL
STEERING ANGULAR VELOCITY
SECOND UPPER LIMIT VALUE
THRESHOLD FOR STARTING STEERING CONTROL
0
T0
T1
T2
T3
T4
TIME
DRIVER'S INPUT
FIRST UPPER LIMIT VALUE
INSTRUCTED STEERING ANGULAR VELOCITY

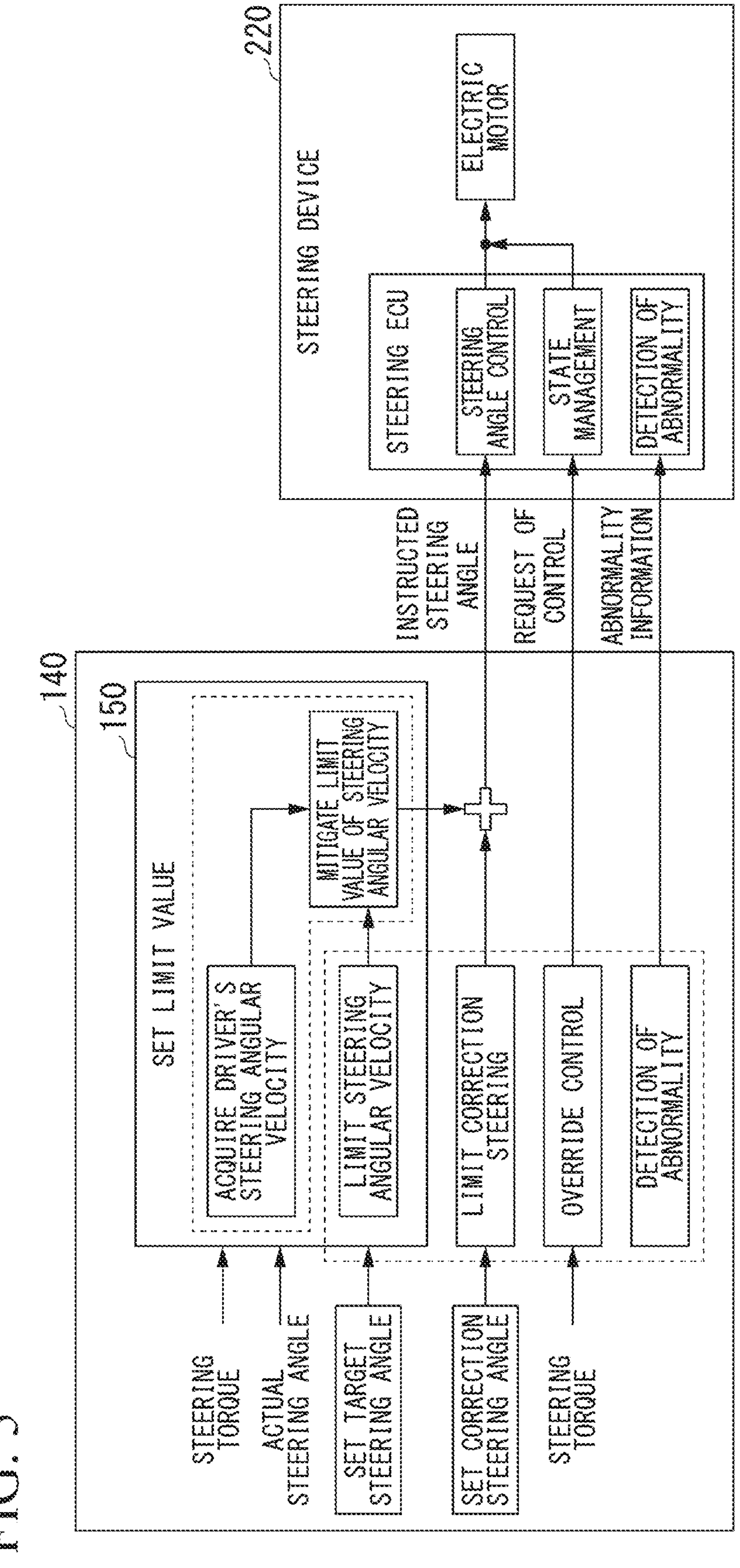
FIG. 5
140
150
220
STEERING DEVICE
STEERING ECU
STEERING ANGLE CONTROL
STATE MANAGEMENT
DETECTION OF ABNORMALITY
ELECTRIC MOTOR
INSTRUCTED STEERING ANGLE
REQUEST OF CONTROL
ABNORMALITY INFORMATION
SET LIMIT VALUE
ACQUIRE DRIVER'S STEERING ANGULAR VELOCITY
MITIGATE LIMIT VALUE OF STEERING ANGULAR VELOCITY
LIMIT STEERING ANGULAR VELOCITY
LIMIT CORRECTION STEERING
OVERRIDE CONTROL
DETECTION OF ABNORMALITY
STEERING TORQUE
ACTUAL STEERING ANGLE
SET TARGET STEERING ANGLE
SET CORRECTION STEERING ANGLE
STEERING TORQUE

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2023-169195, filed Sep. 29, 2023, the content of which is incorporated herein by reference.

BACKGROUND

Field of the Invention

The present invention relates to a vehicle control device, a vehicle control method, and a storage medium.

Description of Related Art

In recent years, efforts to provide access to sustainable transportation systems taking vulnerable people among traffic participants into account have become active. In order to realize this, the efforts are focused on research and development for further improvement in traffic safety and convenience through research and development related to preventive safety technology. In connection with this, regarding steering support devices for preventing a traveling vehicle from departing from a lane, a technology in which a steering limit value at the time of turning in a curved route is made larger than a reference value has been disclosed (for example, Japanese Unexamined Patent Application, First Publication No. 2018-12473).

SUMMARY

Incidentally, a steering operation may be performed by an occupant in order to avoid contact with an obstacle, but there are cases where the occupant cannot perform a sufficient steering operation due to limitation on steering when steering control is being executed at that moment. For this reason, in the related art, a problem has been that it may not be possible to perform appropriate steering control in accordance with a situation of a vehicle.

In order to resolve the foregoing problems, an object of this application is to provide a vehicle control device, a vehicle control method, and a storage medium, in which more appropriate steering control can be performed in accordance with a situation of a vehicle. Further, this will ultimately contribute to development of sustainable transportation systems.

A vehicle control device, a vehicle control method, and a storage medium according to this invention employ the following constitutions.

(1): A vehicle control device according to an aspect of this invention is a vehicle control device including a recognizer that recognizes a surrounding situation of a host vehicle, a driving state detector that detects a driving state including steering of an occupant of the host vehicle, a driving controller that executes steering control for supporting steering of the occupant when there is a probability that the host vehicle will come into contact with a surrounding obstacle on the basis of recognition results of the recognizer and steering of the occupant equal to or larger than a predetermined value has been detected by the driving state detector, and a limiter that adjusts a limit value related to steering of the occupant in accordance with a steering state of the occupant.

(2): According to the aspect of the foregoing (1), the limit value includes a first upper limit value with respect to steering when the steering control is not being performed, and a second upper limit value with respect to steering during the steering control. The driving controller executes steering control such that a steering state during the steering control does not exceed the second upper limit value.

(3): According to the aspect of the foregoing (2), the limiter sets the second upper limit value within a predetermined range from a largest value of a steering state of the occupant detected by the driving state detector.

(4): According to the aspect of the foregoing (2), the limiter adjusts the second upper limit value until a predetermined time elapses after the steering control has been executed.

(5): According to the aspect of the foregoing (3), the limiter causes the adjusted second upper limit value to decrement so as to become close to the first upper limit value with an elapse of time.

(6): According to the aspect of the foregoing (4), the predetermined time is a time shorter than a time when the steering control is predicted to be executed.

(7): According to the aspect of the foregoing (2), the limiter adjusts the second upper limit value in accordance with a steering state of the occupant when the steering state of the occupant detected by the driving state detector exceeds the first upper limit value.

(8): A vehicle control method according to another aspect of the present invention is a vehicle control method in which a computer recognizes a surrounding situation of a host vehicle, detects a driving state including steering of an occupant of the host vehicle, executes steering control for supporting steering of the occupant when there is a probability that the host vehicle will come into contact with a surrounding obstacle on the basis of recognition results and steering of the occupant equal to or larger than a predetermined value has been detected, and adjusts a limit value related to steering of the occupant in accordance with a steering state of the occupant.

(9): A storage medium according to another aspect of the present invention is a computer readable non-transitory storage medium which stores a program causing a computer to recognize a surrounding situation of a host vehicle, to detect a driving state including steering of an occupant of the host vehicle, to execute steering control for supporting steering of the occupant when there is a probability that the host vehicle will come into contact with a surrounding obstacle on the basis of recognition results and steering of the occupant equal to or larger than a predetermined value has been detected, and to adjust a limit value related to steering of the occupant in accordance with a steering state of the occupant.

According to the aspects of the foregoing (1) to (9), it is possible to perform more appropriate steering control in accordance with a situation of a vehicle.

BRIEF DESCRIPTION OF THE DRAWINGS

FIG. 1 is a view of a constitution of a host vehicle M in which a vehicle control device of an embodiment is mounted.

FIG. 5 is a view showing an example in which the function of the limiter described above is applied to control of a driving controller.

DESCRIPTION OF EMBODIMENT

Figure 2:
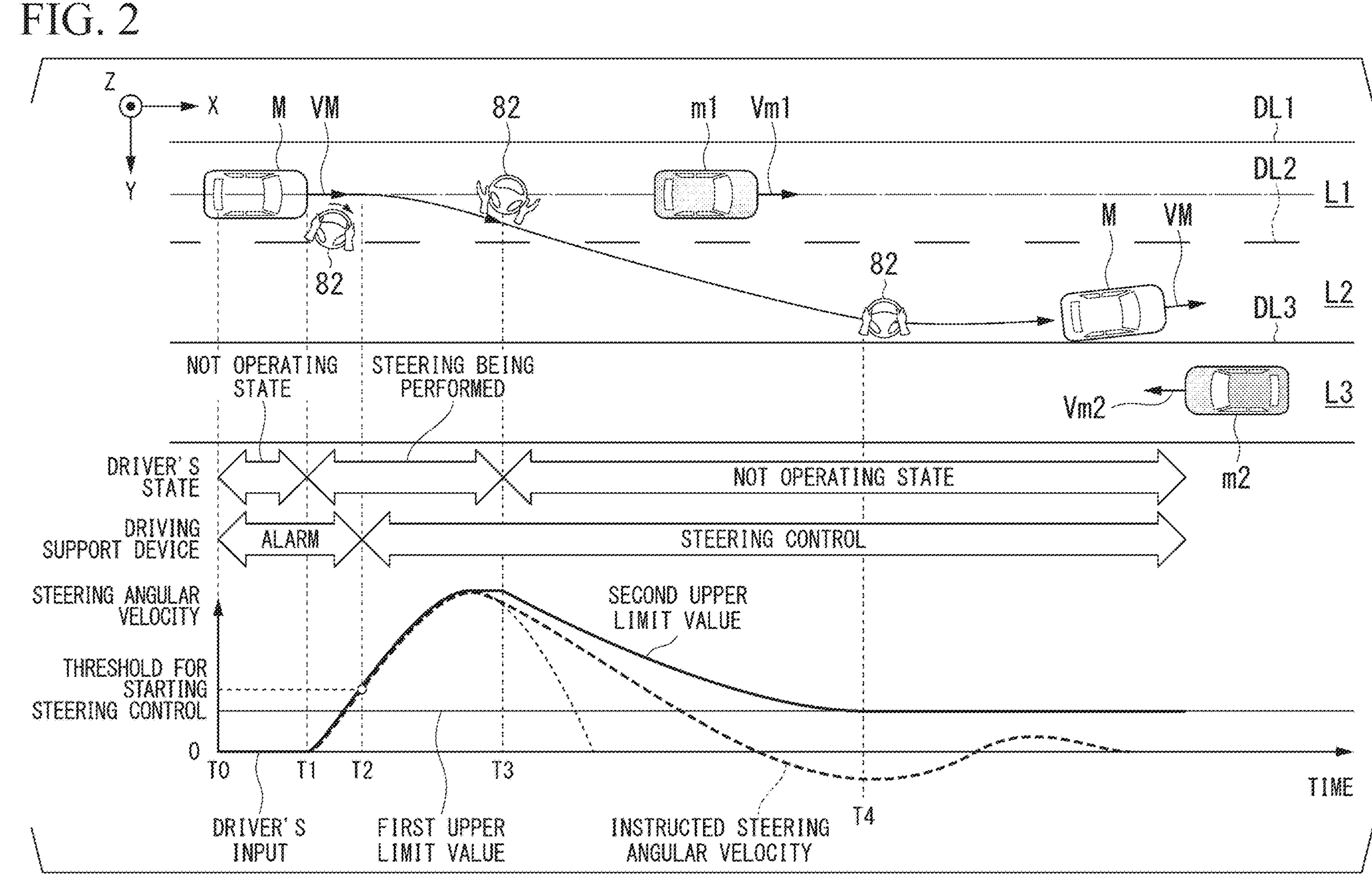
FIG. 2 is an explanatory view of setting a second upper limit value in contact avoidance control.

Hereinafter, with reference to the drawings, an embodiment of a vehicle control device, a vehicle control method, and a storage medium according to the present invention will be described.

[Overall Constitution]

FIG. 1 is a view of a constitution of a host vehicle M in which a vehicle control device of an embodiment is mounted. For example, the host vehicle M is a vehicle having two wheels, three wheels, four wheels, or the like, and a drive source thereof is an internal-combustion engine such as a diesel engine or a gasoline engine, an electric motor, or a combination of these. An electric motor is operated using generated power by a generator connected to an internal-combustion engine, or discharge power of a secondary battery or a fuel cell.

In the host vehicle M, for example, a camera 10, a radar device 12, a light detection and ranging (LIDAR) 14, an object recognition device 16, a communication device 20, a human machine interface (HMI) 30, a vehicle sensor 40, a navigation device 50, a map positioning unit (MPU) 60, a driver monitoring camera 70, a driving operation piece 80, a driving support device 100, a traveling driving force output device 200, a brake device 210, and a steering device 220 are mounted. These devices and instruments are connected to each other through a multiplex communication line such as a controller area network (CAN) communication line, a serial communication line, a wireless communication network, or the like. The constituents shown in FIG. 1 are merely an example. Some of the constituents may be omitted, and other constituents may further be added thereto. The driving support device 100 is an example of "a vehicle control device".

For example, the camera 10 is a digital camera utilizing a solid-state image capturing element such as a charge coupled device (CCD) or a complementary metal oxide semiconductor (CMOS). The camera 10 is attached to an arbitrary location in the host vehicle M. For example, when images on the side in front are captured, the camera 10 is attached to an upper part of a front windshield, a rear surface of a rearview mirror, or the like. For example, the camera 10 captures images around the host vehicle M periodically and repeatedly. The camera 10 may be a stereo camera.

The radar device 12 radiates radio waves such as millimeter waves around the host vehicle M and detects at least the position (distance and azimuth) of an object by detecting radio waves (reflected waves) reflected by the object. The radar device 12 is attached to an arbitrary location in the host vehicle M. The radar device 12 may detect the position and the speed of an object by a frequency modulated continuous wave (FM-CW) method.

The LIDAR 14 emits light (or electromagnetic waves having wavelengths close to that of light) around the host vehicle M and measures scattered light. The LIDAR 14 detects the distance to a target on the basis of the time from light emission to light reception. For example, emitted light is pulsed laser light. The LIDAR 14 is attached to an arbitrary location in the host vehicle M.

The object recognition device 16 recognizes the position, the kind, the speed, and the like of an object by performing sensor fusion processing with respect to detection results of some or all of the camera 10, the radar device 12, and the LIDAR 14. The object recognition device 16 outputs recognition results to the driving support device 100. The object recognition device 16 may output the detection results of the camera 10, the radar device 12, and the LIDAR 14 to the driving support device 100 without any change. The object recognition device 16 may be omitted from the host vehicle M. Some or all of the camera 10, the radar device 12, the LIDAR 14, and the object recognition device 16 are examples of "an external detection device".

For example, the communication device 20 communicates with different vehicles present around the host vehicle M utilizing a cellular network, a Wi-Fi network, Bluetooth (registered trademark), dedicated short range communication (DSRC), or the like or communicates with various server devices via a wireless base station.

The HMI 30 provides various information to an occupant of the host vehicle M and receives an input operation of the occupant. For example, the HMI 30 includes a display, a speaker, a microphone, a buzzer, a vibration generation device (vibrator), a touch panel, a switch, a key, and the like. For example, the display is a liquid crystal display (LCD), an electroluminescence (EL) display device, or the like. For example, the display may be a multi-information display (MID) provided in a central part of an instrument panel of the host vehicle M, may be a meter display provided in a part of the instrument panel in front of a driver's seat, or may be a head-up display (HUD). The display may be provided in a plurality of locations inside a cabin. For example, a display 32 displays various information in the host vehicle M, such as a speedometer showing the traveling speed of the host vehicle M, a tachometer showing the rotation frequency (rotational speed) of the internal-combustion engine provided in the host vehicle M, information (images and video images) related to various driving support executed by the host vehicle M. The display may be constituted integrally with an input as a touch panel. The speaker outputs predetermined audio (for example, an alarm or the like).

The vehicle sensor 40 includes a vehicle speed sensor for detecting a speed of the host vehicle M, an acceleration sensor for detecting an acceleration, a yaw rate sensor for detecting a yaw rate (for example, a rotational angular velocity around a vertical axis passing through the center of gravity of the host vehicle M), a steering angular velocity sensor for detecting a steering angular velocity (actual steering angle) of steered wheels (for example, front wheels) on the basis of the rotational angular velocity, an azimuth sensor for detecting a direction of the host vehicle M, and the like. For example, the steering angular velocity may be acquired as a positive value at the time of left turn and a negative value at the time of right turn. The vehicle sensor 40 may be provided with a position sensor for detecting a position of the host vehicle M. For example, the position sensor is a sensor for acquiring positional information (information of longitude and latitude) from a global positioning system (GPS) device. The position sensor may be a sensor for acquiring positional information using a global navigation satellite system (GNSS) receiver 51 of the navigation device 50. The vehicle sensor 40 may be provided with an abnormality detection sensor for detecting an abnormality such as a malfunction. Detection results of the vehicle sensor 40 are output to the driving support device 100.

For example, the navigation device 50 includes the GNSS receiver 51, a navigation HMI 52, and a route determiner 53. In the navigation device 50, first map information 54 is retained in a storage device such as a hard disk drive (HDD) or a flash memory. The GNSS receiver 51 identifies the position of the host vehicle M on the basis of a signal received from a GNSS satellite. The position of the host vehicle M may be identified or complemented by an inertial navigation system (INS) utilizing an output of the vehicle sensor 40. The navigation HMI 52 includes a display device, a speaker, a touch panel, a key, and the like. Some or all of the navigation HMI 52 may be shared by the HMI 30 described above. For example, the route determiner 53 determines a route from the position of the host vehicle M identified by the GNSS receiver 51 (or an arbitrary input position) to a destination input by an occupant (hereinafter, a route on a map) using the navigation HMI 52 with reference to the first map information 54. For example, the first map information 54 is information in which road shapes are expressed by links indicating roads and nodes connected by the links. The first map information 54 may include curvatures of roads, point-of-interest (POI) information, and the like. The route on the map is output to the MPU 60. The navigation device 50 may perform route guide using the navigation HMI 52 on the basis of the route on the map. For example, the navigation device 50 may be realized by a function of a terminal device such as a smartphone or a tablet terminal possessed by an occupant. The navigation device 50 may transmit a current position and a destination to a navigation server via the communication device 20 and acquire a route equivalent to the route on the map from the navigation server.

For example, the MPU 60 includes a recommendation lane determiner 61 and retains second map information 62 in a storage device such as an HDD or a flash memory. The recommendation lane determiner 61 divides the route on the map provided from the navigation device 50 into a plurality of blocks (for example, divides it into blocks of 100 [m] in a vehicle proceeding direction) and determines a recommendation lane for each block with reference to the second map information 62. The recommendation lane determiner 61 determines which lane from the left the vehicle should travel. When a branch point is present in the route on the map, the recommendation lane determiner 61 determines a recommendation lane such that the host vehicle M can travel along a reasonable route to proceed to a branch destination. The second map information 62 is map information that is more accurate than the first map information 54. For example, the second map information 62 includes information of a center of a lane, lane boundary information such as road division lines dividing a lane, or the like. The second map information 62 may include road information, positions of road shoulders, traffic regulation information, address information (address, postal code), facility information, telephone number information, and the like. The second map information 62 may be updated at any time by the communication device 20 through communication with other devices. The first map information 54 and the second map information 62 may be stored in a storage inside the driving support device 100.

For example, the driver monitoring camera 70 is a digital camera utilizing a solid-state image capturing element such as a CCD or a CMOS. The driver monitoring camera 70 is attached to an arbitrary location in the host vehicle M in a position and a direction in which images of the head and the upper body (including positions of the hands) of at least a driver seated in the driver's seat (hereinafter, a driver) of the host vehicle M of occupants riding in the host vehicle M can be captured from the front (in a direction in which images of the face are captured). For example, the driver monitoring camera 70 is attached to an upper part of the display device provided in the central part of the instrument panel of the host vehicle M, for example. The driver monitoring camera 70 outputs images of the inside of the cabin including the driver of the host vehicle M captured from the disposed position to the driving support device 100.

For example, the driving operation piece 80 includes a steering wheel 82, an accelerator pedal 84, a brake pedal 86, an operation switch of a blinker lever (direction indicator), a shift lever, and other operation pieces. A sensor for detecting an amount of operation or whether there is an operation is attached to the driving operation piece 80, and detection results thereof are output to some or all of the driving support device 100, the traveling driving force output device 200, the brake device 210, and the steering device 220.

For example, the steering wheel 82 is a steering operation piece which is attached to a steering shaft and receives a steering operation of the host vehicle M by the driver, and is equipped with an electric power steering (EPS) function. The steering wheel 82 is provided with a steering wheel sensor (hereinafter, SW sensor) 82A. The SW sensor 82A detects whether or not the driver is gripping the steering wheel 82. The SW sensor 82A detects steering information of the steering wheel 82. For example, steering information includes a steering torque generated around a shaft (rotation shaft), a rotational angular velocity (steering angular velocity), a magnitude of a steering force (amount of steering), and the like. For example, at least one of the steering information (for example, a steering torque) may be acquired as a positive value in the left direction and a negative value in the right direction from a neutral state of the steering wheel 82.

The accelerator pedal 84 is attached to an accelerator pedal sensor (AP sensor) 84A. The AP sensor 84A detects the amount of operation (opening degree) of the accelerator pedal 84 changing in accordance with a driver's operation with respect to the accelerator pedal 84 or a request from the system side. The brake pedal 86 is provided with a brake pedal sensor (BP sensor) 86A. The BP sensor 86A detects the amount of operation (opening degree) of the brake pedal 86 changing in accordance with a driver's operation with respect to the brake pedal 86 or a request from the system side.

The traveling driving force output device 200 outputs a traveling driving force (torque) for causing the host vehicle M to travel to driving wheels. For example, the traveling driving force output device 200 includes a combination of an internal-combustion engine, an electric motor, a transmission, and the like, and an electronic control unit (ECU) controlling these. The ECU controls the foregoing constituents in accordance with information input from the driving support device 100 or the driving operation piece 80.

For example, the brake device 210 includes a brake caliper, a cylinder transmitting a hydraulic pressure to the brake caliper, an electric motor generating a hydraulic pressure in the cylinder, and an ECU. The ECU controls the electric motor in accordance with information input from the driving support device 100 or the driving operation piece 80 such that a brake torque corresponding to a braking operation is output to each of the wheels. The brake device 210 may include, as a backup, a mechanism for transmitting a hydraulic pressure generated through an operation of the brake pedal included in the driving operation piece 80 to the cylinder via a master cylinder. The brake device 210 is not limited to the constitution described above and may be an electronically controlled hydraulic brake device transmitting a hydraulic pressure of the master cylinder to the cylinder by controlling an actuator in accordance with information input from the driving support device 100.

For example, the steering device 220 includes a steering ECU and an electric motor. For example, the electric motor causes a force to act on a rack-and-pinion mechanism to change the direction of the steered wheels. The steering ECU performs processing such as driving the electric motor in accordance with information input from the driving support device 100 or the driving operation piece 80 (for example, an instructed steering angle) and changing the direction of the steered wheels.

[Driving Support Device]

For example, the driving support device 100 includes a recognizer 110, a driving state detector 120, a contact probability judger 130, a driving controller 140, a limiter 150, an HMI controller 160, and a storage 170. For example, the recognizer 110, the driving state detector 120, the contact probability judger 130, the driving controller 140, the limiter 150, and the HMI controller 160 are realized by a hardware processor such as a central processing unit (CPU) executing a program (software). Some or all of these constituent elements may be realized by hardware (circuit; including circuitry) such as a large scale integration (LSI), an application specific integrated circuit (ASIC), a field-programmable gate array (FPGA), or a graphics processing unit (GPU), or may be realized by software and hardware in cooperation. A program may be stored in a storage device such as an HDD or a flash memory (a storage device including a non-transitory storage medium) of the driving support device 100 in advance or may be stored in an attachable/detachable storage medium such as a DVD or a CD-ROM such that the program is installed in the HDD or the flash memory of the driving support device 100 when the storage medium (non-transitory storage medium) is mounted in a drive device. The HMI 30 and the HMI controller 160 are examples of "an output".

For example, setting is performed inside the traveling driving force output device 200, the brake device 210, and the steering device 220 such that instructions from the driving support device 100 to the traveling driving force output device 200, the brake device 210, and the steering device 220 are executed with priority over detection results from the driving operation piece 80. Regarding braking, when a braking force based on the amount of operation of the brake pedal 86 is larger than that in an instruction from the driving support device 100, setting may be performed such that the latter is executed with priority. Regarding a structure for executing an instruction from the driving support device 100 with priority, a communication priority in an in-car local area network (LAN) may be used. Regarding steering, setting may be performed such that it is executed by adding a steering force based on an instruction from the driving support device 100 and a steering force based on the amount of operation of the steering wheel 82 by the driver.

The storage 170 may be realized by the various storage devices described above, a solid state drive (SSD), an electrically erasable programmable read only memory (EEPROM), a read only memory (ROM), a random access memory (RAM), or the like. For example, the storage 170 stores a program, various other information, and the like. The storage 170 may store the map information (the first map information 54 and the second map information 62) described above.

The recognizer 110 recognizes the surrounding situation of the host vehicle M on the basis of information input from the external detection device. For example, the recognizer 110 recognizes a state of an object present around it (for example, within a predetermined distance from the host vehicle M), such as a position, a speed, and an acceleration. For example, an object is a different vehicle, a bicycle, a pedestrian, or the like. For example, the position of an object is recognized as a position on absolute coordinates with an origin at a representative point (centroid, drive shaft center, or the like) in the host vehicle M and is used for control. The position of an object may be indicated by a representative point such as a centroid or a corner of the object or may be indicated as a region. A "state" of an object may include an acceleration or a jerk of the object or "an action state" (for example, whether or not it is making a lane change or attempting a lane change). The recognizer 110 recognizes the relative position and the relative speed with respect to an object.

For example, the recognizer 110 recognizes a lane in which the host vehicle M is traveling (traveling lane). For example, the recognizer 110 recognizes the traveling lane by comparing patterns (for example, arrays of solid lines and dotted lines) of road division lines obtained from the second map information 62 and patterns of road division lines around the host vehicle M recognized from images captured by the camera 10. The recognizer 110 may recognize the traveling lane by recognizing traveling path boundaries (road boundaries) including road division lines, road shoulders, curbstones, median strips, guardrails, and the like without being limited to road division lines. In this recognition, a position of the host vehicle M acquired from the navigation device 50 or processing results of the INS may be added. The recognizer 110 recognizes obstacles, stop lines, red lights, toll gates, and other road events from the recognition results of an object. Obstacles are objects with which the host vehicle M needs to avoid contact, and they include, for example, different vehicles and the like.

When recognizing the traveling lane, the recognizer 110 recognizes a position or a posture of the host vehicle M with respect to the traveling lane. For example, the recognizer 110 may recognize a deviation of a reference point in the host vehicle M from the center of the lane and an angle formed with respect to a line of the centers of the lane of the host vehicle M in the proceeding direction as a relative position and a posture of the host vehicle M with respect to the traveling lane. Instead of this, the recognizer 110 may recognize a position or the like of a reference point in the host vehicle M with respect to any side end part (road division line or road boundary) of the traveling lane as a relative position of the host vehicle M with respect to the traveling lane.

The driving state detector 120 detects a driving state of an occupant of the host vehicle M (for example, a driver). For example, the driving state is an operation state of the driving operation piece 80 by the driver (information indicating a degree of an operation). For example, the operation state includes a steering state of the steering wheel 82. For example, the steering state includes information of the steering angular velocity detected by the SW sensor 82A. The steering state may include information indicating whether or not the driver is gripping the steering wheel 82 or steering information other than the steering angular velocity. The operation state of the driving operation piece 80 may include an operation state such as the opening degrees of the accelerator pedal 84 and the brake pedal 86 detected by the AP sensor 84A and the BP sensor 86A, and an accelerating operation and an decelerating operation based on the amount of change in opening degree.

The driving state detector 120 may detect the driver's driving state on the basis of analysis results of camera images captured by the driver monitoring camera 70. For example, the driving state detector 120 detects whether or not the driver is gripping the steering wheel 82 on the basis of positions, shapes, movement, and the like of the hands included in camera images or detects the driving state such as a steering direction or an amount of steering based on movement, a movement direction, or the like of the gripping hands. The driving state detector 120 may detect the driver's driving state (operation state) by combining detection results of each of the sensors of the driving operation piece 80 and analysis results of camera images.

The contact probability judger 130 recognizes whether or not there is a probability of contact between an obstacle (for example, a different vehicle) and the host vehicle M on the basis of the surrounding situation (external information) recognized by the recognizer 110. For example, the contact probability judger 130 judges whether or not there is a probability of contact between the host vehicle M and a different vehicle on the basis of a contact margin value with respect to a different vehicle (preceding vehicle) present in front of the host vehicle M on the basis of the surrounding situation. A contact margin value is an index value indicating a margin degree and is a value set on the basis of a contact margin time TTC (time to collision), for example, but it may be a value set on the basis of an inter-vehicle time THW (time headway). For example, in the relationship between the host vehicle M and a different vehicle, the contact margin time TTC is derived by dividing the relative distance by the relative speed. For example, the inter-vehicle time THW is derived by dividing the relative distance (inter-vehicle distance) by the speed of the host vehicle M. For example, the contact margin time TTC may be derived using a learned model in which the contact margin time TTC is output when the positions and the speeds of the host vehicle M and a different vehicle are input, a predetermined function, or the like, or it may be derived using a correspondence table in which the relative speed and the relative position are associated with the contact margin time TTC. Similarly, the foregoing derivation method also applies to the inter-vehicle time THW. For example, the shorter the contact margin time TTC (or the inter-vehicle time THW), the smaller the margin degree (in other words, the longer the contact margin time, the larger the margin degree). For example, the contact probability judger 130 judges that there is a probability of contact between the host vehicle M and a different vehicle when the contact margin value is smaller than a threshold, and it judges that there is no probability of contact when the contact margin value is equal to or larger than the threshold.

The driving controller 140 executes driving control (automatic driving) for controlling one or both steering and acceleration/deceleration of the host vehicle M on the basis of at least one of recognition results of the recognizer 110, detection results of the driving state detector 120, and judgment results of the contact probability judger 130. For example, the driving controller 140 generates a target trajectory (including information related to steering and speed) such that the host vehicle M travels correspondingly to the recommendation lane determined by the recommendation lane determiner 61 or various driving control (which will be described below) on the basis of the surrounding situation, generates a target value (target steering angle or target speed) such that the host vehicle M travels along the generated target trajectory, and executes driving control corresponding to the generated target value.

The driving controller 140 performs lane keeping assistance system (LKAS) control of the host vehicle M such that a reference point (for example, the centroid or the center) of the host vehicle M is positionally set at the center of the traveling lane of the host vehicle M on the basis of the surrounding situation. In the LKAS control, for example, when the steering direction based on the steering torque applied to the steering wheel 82 by the driver is a direction in which the host vehicle M departs from the center of the lane (or the traveling lane), departure from the center of the lane (or the traveling lane) is curbed by applying a reaction force to the steering operation in the direction. In the LKAS control at normal times (for example, when there is no probability of contact with an obstacle), a limit (upper limit value) is provided in the amount of driver's steering operation so that departure of the host vehicle M from the traveling lane due to an excessive steering operation is curbed.

The driving controller 140 may execute various driving control such as auto lane change assist (ALCA) for supporting a lane change of the host vehicle M from the traveling lane to an adjacent lane on the basis of the surrounding situation recognized by the recognizer 110, control of adaptive cruise control system (ACC) for traveling after a preceding vehicle, collision mitigation brake system (CMBS) control for performing braking control of the host vehicle M by warning the occupant when there is a probability of contact with an obstacle, and traffic jam pilot (TJP) control for traveling while the inter-vehicle distance is maintained in accordance with change in vehicle speed of a preceding vehicle during low-speed traveling such as in congestion.

For example, the driving controller 140 includes a contact avoidance controller 142. When the contact probability judger 130 judges that there is a probability of contact between the host vehicle M and a surrounding obstacle, and when the driving state detector 120 has detected driver's steering equal to or larger than a predetermined value (threshold for starting steering control), the contact avoidance controller 142 executes steering control for supporting the driver's steering state. For example, the contact avoidance controller 142 executes steering control for supporting driver's steering such that the behavior of the host vehicle M becomes stable after a driver's steering operation for avoiding contact with an obstacle. In this steering control, for example, similar to the LKAS control, a limit value (upper limit value) is provided in the amount of steering so as to prevent sudden behavior exceeding the driver's expectations, and further lateral movement of the host vehicle M to a next adjacent lane is curbed after a steering operation for laterally moving the host vehicle M to an adjacent lane to avoid contact with an obstacle has been performed. For example, when avoidance is possible within the traveling lane of the host vehicle M, the contact avoidance controller 142 may perform the steering control for movement in a direction in which the host vehicle M does not come into contact with an obstacle within a range not departing from the same lane without depending on a driver's steering operation. For example, the steering control by the contact avoidance controller 142 may be executed when the speed of the host vehicle M is equal to or higher than a predetermined speed. Instead of (or in addition to) the steering control described above, the contact avoidance controller 142 may execute acceleration/deceleration control for avoiding contact between the host vehicle M and an obstacle.

For example, when an instruction from the occupant is received, the driving controller 140 may execute or end predetermined driving control in accordance with the instruction. When the driver performs a predetermined operation with respect to the driving operation piece 80 such as the steering wheel 82, the accelerator pedal 84, or the brake pedal 86 while predetermined driving control is being executed, the driving controller 140 may perform override control for ending the driving control being executed and switching to manual driving. When an abnormality such as a malfunction is detected by the vehicle sensor 40, the driving controller 140 may perform control for curbing operation or the like by outputting abnormality information indicating details of an abnormality to the traveling driving force output device 200, the brake device 210, the steering device 220, or the like.

The limiter 150 adjusts the limit value (upper limit value, limiter) related to driver's steering in accordance with the driver's steering state. For example, the limit value includes a first upper limit value with respect to driver's steering when the steering control is not being performed by the contact avoidance controller 142, and a second upper limit value with respect to steering when the steering control is being performed by the contact avoidance controller 142. For example, the first upper limit value is an upper limit value at the time of the LKAS control described above. For example, when the driver's steering state exceeds the first upper limit value, the limiter 150 adjusts the second upper limit value in accordance with the steering state of the occupant detected by the driving state detector 120. The driving controller 140 performs the steering control such that the steering state of the steering control does not exceed the second upper limit value when the steering control is being performed by the contact avoidance controller 142 and performs the steering control such that it does not exceed the first upper limit value when the steering control is not being performed (when driving control other than contact avoidance control is being executed). Even when the steering control is not being performed, the limiter 150 may allow a steering state within a predetermined range exceeding the first upper limit value when predetermined conditions such as a high probability of execution of operation control are satisfied. Details of processing of the limiter 150 will be described below.

The HMI controller 160 outputs predetermined information to the HMI 30 so that an occupant is provided with (notified of) the information. For example, the predetermined information includes information related to traveling of the host vehicle M, such as information related to the state of the host vehicle M and information related to driving control. For example, the information related to the state of the host vehicle M includes a speed of the host vehicle M, a rotation frequency of the engine, a shift position, and the like. For example, the information related to driving control includes the kind of driving control being executed, the reason for the operation of driving control, the situation of driving control, and the like. The information related to driving control may include information related to attention calling or an alarm with respect to the driver associated with the driving control to be executed. The predetermined information may include information and the like related to a current position, a destination, and a remaining amount of fuel of the host vehicle M, and it may include information which is not related to traveling control of the host vehicle M, such as TV programs and contents (for example, movies) stored in a storage medium such as a DVD.

For example, the HMI controller 160 may generate images including the predetermined information described above and cause the display 32 of the HMI 30 to display the generated images or may generate audio indicating predetermined information and output the generated audio from a speaker 34 of the HMI 30. For example, the timing of outputting an image or audio is a timing when information is obtained from the vehicle sensor 40 or each of the constituents of the driving support device 100, a timing when driving control is started or suspended, a timing when information is received from the outside by the communication device 20, a timing when an image to be displayed is switched, a timing when the host vehicle M is in a predetermined state, or the like. The HMI controller 160 may output information received through the HMI 30 to the driving state detector 120, the driving controller 140, and the like.

[Limiter]

Next, details of processing of the limiter 150 will be described. Hereinafter, description will focus mainly on details of adjustment of the second upper limit value. FIG. 2 is an explanatory view of setting of the second upper limit value in the contact avoidance control. The example in FIG. 2 shows lanes L1 and L2 allowing proceeding in the same direction (X axis direction in the diagram), and a lane L3 allowing proceeding in a direction opposite to the lanes L1 and L2 (negative X axis direction in the diagram). The lane L1 is divided by road division lines DL1 and DL2, and the lane L2 is divided by road division lines DL2 and DL3. The road division line DL2 is a division line allowing a lane change between the lane L1 and the lane L2. In the example in FIG. 2, it is assumed that a time T0 is the earliest time followed by times T1, T2, T3, and T4 in this order. At the moment of the time T0, it is assumed that the host vehicle M is traveling along the lane L1 in an extending direction at a speed VM, a different vehicle m1 in front of the host vehicle M is traveling along the lane L1 in the extending direction at a speed Vm1, and a different vehicle m2 is traveling along the lane L3 in the extending direction at a speed Vm2 in a direction opposite to the host vehicle M. The different vehicles m1 and m2 are examples of "an obstacle". The example in FIG. 2 shows the driver's driving state with an elapse of time (hereinafter, a driver's state) and details of operation of the driving support device 100 and shows a situation of change in driver's input, limit value (upper limit value), and instruction value related to the steering angular velocity. In the example in FIG. 2, for example, it is assumed that a limit value utilized in the LKAS control is set as the first upper limit value and the first upper limit value and the second upper limit value are the same values at the time T0.

First, at the time T0, it is assumed that the driving controller 140 has executed driving control (for example, the LKAS control) based on the surrounding situation. In this case, the driver's state detected by the driving state detector 120 is a not operating state. For example, a not operating state is a state in which a steering operation (driver's input) has not been performed (for example, a state of simply gripping the steering wheel 82 due to straight traveling or the like).

The contact probability judger 130 continuously judges whether or not there is a probability of contact between the host vehicle M and the different vehicle m1 on the basis of the surrounding situation of the host vehicle M recognized by the recognizer 110. At the time T0, since the contact margin time TTC between the host vehicle M and the different vehicle m1 is shorter than a predetermined time, it is assumed that the contact probability judger 130 has judged that there is a probability of contact. In this case, the HMI controller 160 calls attention of the driver via the HMI 30 or outputs an alarm for notifying that there is a probability of contact.

At the time T1, while an alarm is being output, the driver performs a driving operation including a steering operation by the steering wheel 82. When a driver's input (for example, a steering torque) with respect to a steering operation is received, the contact avoidance controller 142 generates an instructed steering angle on the basis of a steering torque, an actual steering angle obtained from the vehicle sensor 40, or the like and outputs the information of the generated instructed steering angle to the steering device 220. The steering device 220 performs control such as driving the electric motor in accordance with the instructed steering angle and changing the direction of the steered wheels. In the example in FIG. 2, during the times T1 to T2, the instructed steering angle (instructed steering angular velocity) increments in response to the increment in steering angular velocity by a driver's input (increment in amount of steering). In the example in FIG. 2, a driver's input has exceeded the first upper limit value before execution of the steering control has started. However, when driving control such as LKAS based on the first upper limit value has not been executed, or when there is a high probability that the contact avoidance controller 142 will execute operation control on the basis of the surrounding situation and the driver's operation situation even if the LKAS control is being executed (for example, when the amount of change in steering angular velocity during a predetermined time is equal to or larger than a threshold), an instructed steering angle exceeding the first upper limit value is generated, and the second upper limit value is also adjusted in advance.

During a period from the time T1 to the time T2, since the probability of contact between the host vehicle M and the different vehicle m1 continues even if there is a driver's input, the HMI controller 160 continues to output an alarm.

Next, at the time T2, since the steering angular velocity input by the driver has exceeded the threshold for starting steering support, the contact avoidance controller 142 executes the steering control with respect to the driver's steering operation. In the steering control, for example, control for limiting the amount of steering is performed on the basis of the second upper limit value to prevent the amount of lateral movement of the host vehicle M from being excessive due to a sudden steering operation exceeding the operation state generated by the driver's operation. In this scene, the limiter 150 adjusts the second upper limit value until a predetermined time elapses after the steering control has been executed to prevent limitation on steering based on the second upper limit value from making it impossible to obtain a sufficient amount of lateral movement necessary to avoid contact with the different vehicle m1.

Figure 3:
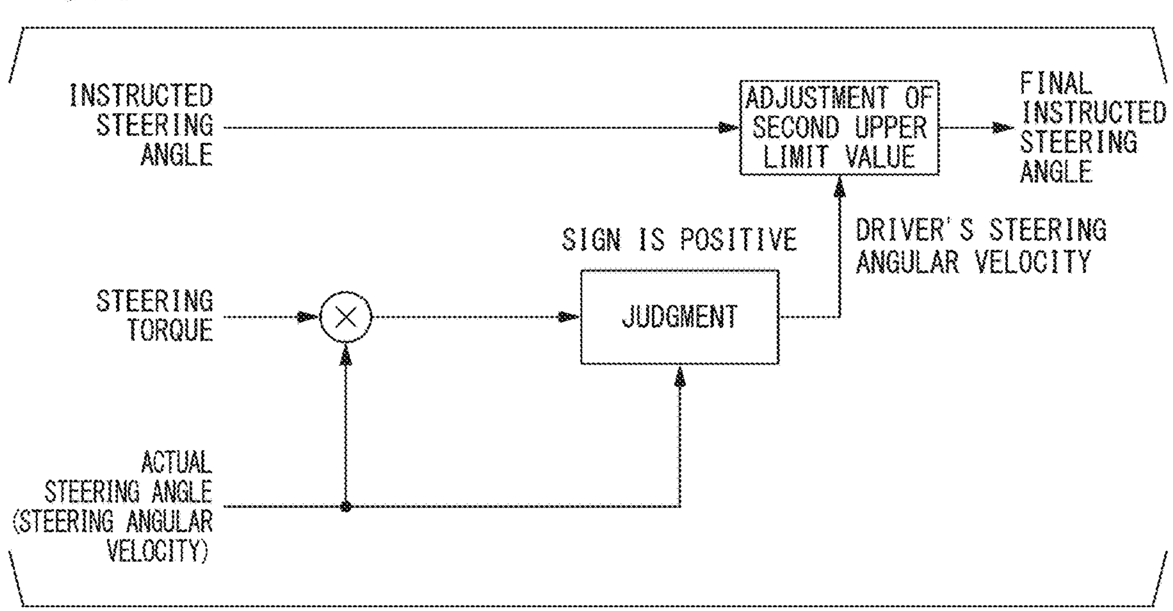
FIG. 3 is an explanatory view of details of adjustment of the second upper limit value by a limiter.

FIG. 3 is an explanatory view of details of adjustment of the second upper limit value by the limiter 150. The example in FIG. 3 schematically shows a flow until the second upper limit value is adjusted (adjustment of the limiter) on the basis of the instructed steering angle from the system side (driving controller 140), the steering torque input by the driver, and the actual steering angle (steering angular velocity) obtained from the vehicle sensor 40, and a final instructed steering angle output to the steering device 220 is obtained on the basis of the adjusted details.

In the example in FIG. 3, the limiter 150 multiplies the value of the steering torque including the positive/negative sign by the value corresponding to the actual steering angle including the positive/negative sign and performs judgment based on the multiplication result. Since the positive/negative sign is associated with the lateral direction, when the sign of a multiplication result is positive (>0), it is judged that the steering direction based on the steering torque and the direction of the actual steering angle are the same direction. Namely, when the sign is positive, it can be judged that the actual steering angle corresponds to the driver's steering operation (manual driving) (in other words, driving control (control on the system side) is not performed). Therefore, when the sign is positive, the limiter 150 adjusts the second upper limit value in accordance with the driver's steering angular velocity based on the steering torque.

For example, the limiter 150 sets the second upper limit value within a predetermined range from the largest value (for example, approximately±several percent of the largest value) of the driver's steering state (steering angular velocity), for example. Therefore, as shown in FIG. 2, the second upper limit value increments correspondingly to the increment in steering torque (steering angular velocity) input by the driver. Therefore, the instructed steering angle shown in FIG. 3 is output to the steering device 220 as a final instructed steering angle without being curbed by the second upper limit value.

In this manner, by adjusting the second upper limit value to be equal to or larger than the largest value of the steering torque, it is possible to perform lateral movement of the host vehicle M (movement in the road width direction (Y axis direction)) necessary for contact avoidance without curbing a steering operation by the adjusted second upper limit value. Moreover, it is possible to curb an excessive output of steering due to the steering control by setting the largest value.

The limiter 150 adjusts the second upper limit value when the steering torque and the actual steering angle are in the same direction as shown in FIG. 3, and adjustment of the second upper limit value may not be performed when they are in the opposite directions (when the sign is negative). When the steering torque is in a direction different from that of the actual steering angle, since control on the system side has been executed without depending on a driver's steering operation or steering has been performed in a direction in which the actual steering angle decrements, a processing load can be reduced by curbing unnecessary adjustment of the upper limit value.

In the example in FIG. 2, the steering angular velocity input by the driver has decremented before reaching the time T3. In this case, as shown in FIG. 2, the limiter 150 may maintain the state of the second upper limit value set correspondingly to the largest value. Since driver's steering is being performed at this moment and there is a probability that the steering angular velocity will increment again, it is possible to curb fluctuation of increment and decrement in second upper limit value by maintaining the state of the second upper limit value. The limiter 150 may adjust the second upper limit value such that it follows the decrement in steering angular velocity.

At the time T3, the driver's state is a not operating state. Namely, at the time T3, for example, the driver is in a state in which he/she has judged that contact could be avoided due to a steering operation of himself/herself and no steering operation is performed. In this case, the contact avoidance controller 142 successively executes the steering control for making the host vehicle M stable. For example, while allowing a lane change of the host vehicle M from the current traveling lane (lane L1) to an adjacent lane (lane L2) on the basis of the surrounding situation recognized by the recognizer 110, the contact avoidance controller 142 generates a target trajectory (target steering angle) of the host vehicle M such that movement to a next adjacent lane (lane L3) is prevented, generates an instructed steering angle such that the host vehicle can travel along the generated target trajectory (instructed steering angular velocity shown in FIG. 2), and outputs it to the steering device 220. The steering device 220 executes steering based on the instructed steering angle. Accordingly, as shown in FIG. 2, stable behavior of the host vehicle M is realized.

At the time T3, when the driver ends a steering operation (in the case of a not operating state), the limiter 150 causes the adjusted second upper limit value to decrement so as to become close to the first upper limit value with an elapse of time. The decrement rate may be a fixed value or may be a variable value based on the road situation, the speed VM of the host vehicle M, or the like. In this manner, in an initial stage of operation of the contact avoidance control, since necessary lateral movement of the host vehicle M is secured by mitigating steering due to the increment in second upper limit value and the necessary amount of lateral movement decrements with an elapse of time, the second upper limit value is caused to decrement. Accordingly, it is possible to curb mitigation of limitation on steering more than necessary. When the steering angular velocity input by the driver has decremented by a predetermined value or more, the limiter 150 may cause the second upper limit value to decrement even if the driver is performing steering.

The limiter 150 may perform control such that the second upper limit value described above is adjusted until a predetermined time elapses after the steering control has been executed. This predetermined time is a time shorter than the time when the steering control is predicted to be executed (predicted execution time). For example, the predicted execution time is derived based on the speed VM of the host vehicle M, the relative position and the relative speed with respect to the different vehicles m1 and m2, the road shape (lane width, the number of lanes, curvature), the amount of steering, and the like. For example, the predicted execution time is a time when the host vehicle M can travel without departing to another lane (lane L3) next to the adjacent lane (lane L2). The predetermined time may be set to a time corresponding to steering responsiveness of the host vehicle M (for example, approximately 2 to 4 [sec]). In the example in FIG. 2, at the time T4 when the host vehicle M can stably travel within the lane L2, the second upper limit value is adjusted to return to the original value (the same value as the first upper limit value). In the final stage of the steering control, since steering of maintaining the lane is performed after movement to the adjacent lane, it can be handled even with a normal limit value. Therefore, it is possible to curb excessive mitigation of the limit value and make the behavior stable at an early stage after a contact avoidance operation by adjusting only the predetermined time.

Since the steering control is performed based on driver's steering during the period of the times T3 to T4, the HMI controller 160 may output instruction information through the HMI 30 to cause the driver to monitor the surroundings until the behavior of the host vehicle M becomes stable (until the amount of change in behavior becomes equal to or smaller than a predetermined level). After the time T4, since the behavior of the host vehicle M is in a stable state, the steering control continues without adjusting the second upper limit value.

Figure 4:
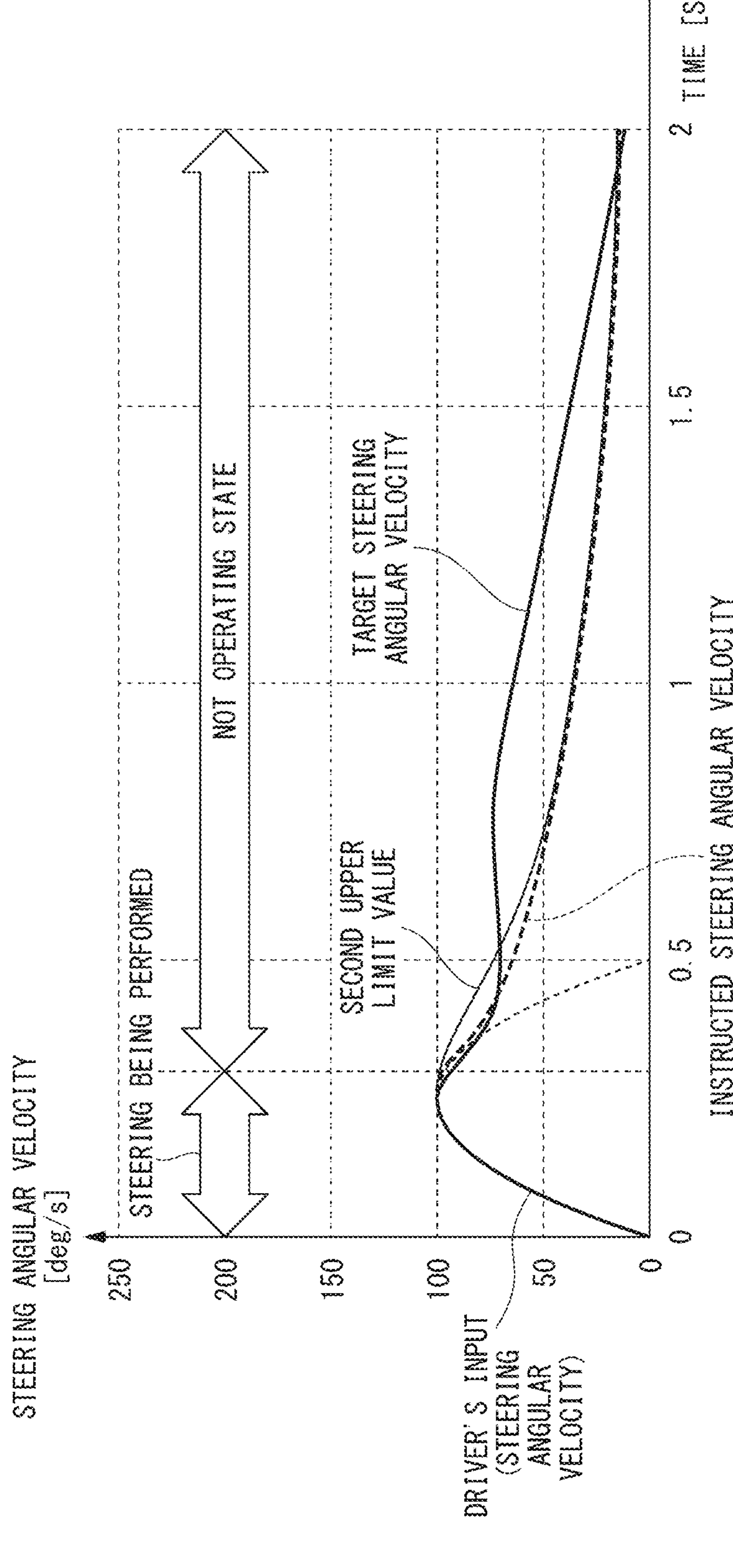
FIG. 4 is an explanatory view of an operation example in a case where an excessive target steering angular velocity is input in a state in which an instruction value and a limit value have decremented.

For example, when a target steering angular velocity based on driving control is input in a state in which the instructed steering angular velocity and the second upper limit value have decremented, the driving controller 140 executes control based on the decremented second upper limit value. FIG. 4 is an explanatory view of an operation example in a case where an excessive target steering angular velocity is input in a state in which an instruction value and a limit value have decremented. In the example in FIG. 4, the horizontal axis indicates time [sec], and the vertical axis indicates steering angular velocity [deg/s]. For example, in a state in which the second upper limit value and the instructed steering angular velocity have decremented as shown in FIG. 4, when, a target steering angular velocity with a value larger than these is input, the limiter 150 continues the decrement without causing the second upper limit value to increment. Therefore, as shown in FIG. 4, the driving controller 140 executes the steering control corresponding to the instructed steering angular velocity which does not exceed the second upper limit value. Accordingly, even if the second upper limit value is being adjusted, it is possible to realize more appropriate driving control. In this stage, since the driver is in a not operating state, it is possible to curb a situation in which the host vehicle M becomes unstable by causing the second upper limit value to increment so as to allow more significant behavior.

FIG. 5 is a view showing an example in which the function of the limiter 150 described above is applied to control of the driving controller 140. The example in FIG. 5 mainly shows an example of a functional block related to the steering control of the driving controller 140 and the steering device 220. In the example in FIG. 5, the driving controller 140 sets a target steering angle corresponding to the current actual steering angle or the current target trajectory of the host vehicle M or sets a correction steering angle based on the amount of deviation (for example, a steering response error) of the steering torque, the actual steering angle, and the like. The driving controller 140 limits the steering angular velocity on the basis of the limit value with respect to the set target steering angle. Here, in order to adjust the limit value of the steering angular velocity, as shown in FIG. 3, the limiter 150 acquires the driver's steering angular velocity on the basis of the steering torque and the actual steering angle and mitigates (adjusts) the limit value of the steering angular velocity in accordance with the acquired steering angular velocity. The driving controller 140 generates an instructed steering angle on the basis of the target steering angle and the correction steering angle, in which limitation has been mitigated, and output it to the steering device 220. The steering ECU of the steering device 220 performs processing such as driving the electric motor by performing steering angle control based on the instructed steering angle and changing the direction of the steered wheels.

For example, the driving controller 140 may execute the override control corresponding to the amount of steering such as a steering torque. In such a case, a request of control for switching from the driving control which is being executed to manual driving is output to the steering device 220. The steering ECU performs state management based on the request of control, and when the steering angle control during driving control is being executed, control for suspending (ending) it is performed. When the vehicle sensor 40 detects an abnormality (for example, a malfunction of sensor equipment) or the like related to traveling of the host vehicle M, the driving controller 140 may output abnormality information to the steering device 220. In this case, the steering ECU performs control of the steering device 220 (suspending driving control) or the like corresponding to detection of an abnormality. As shown in FIG. 5, in the steering control in the driving controller 140, the host vehicle M can perform necessary lateral movement in accordance with the steering control or the like for avoiding contact with an obstacle by executing the control by the limiter 150 described above.

[Processing Flow]

Next, processing executed by the driving support device 100 according to the embodiment will be described. Hereinafter, description will focus mainly on steering control processing, of the processing executed by the driving support device 100, in which the limit value is adjusted in the contact avoidance controller 142.

Figure 6:
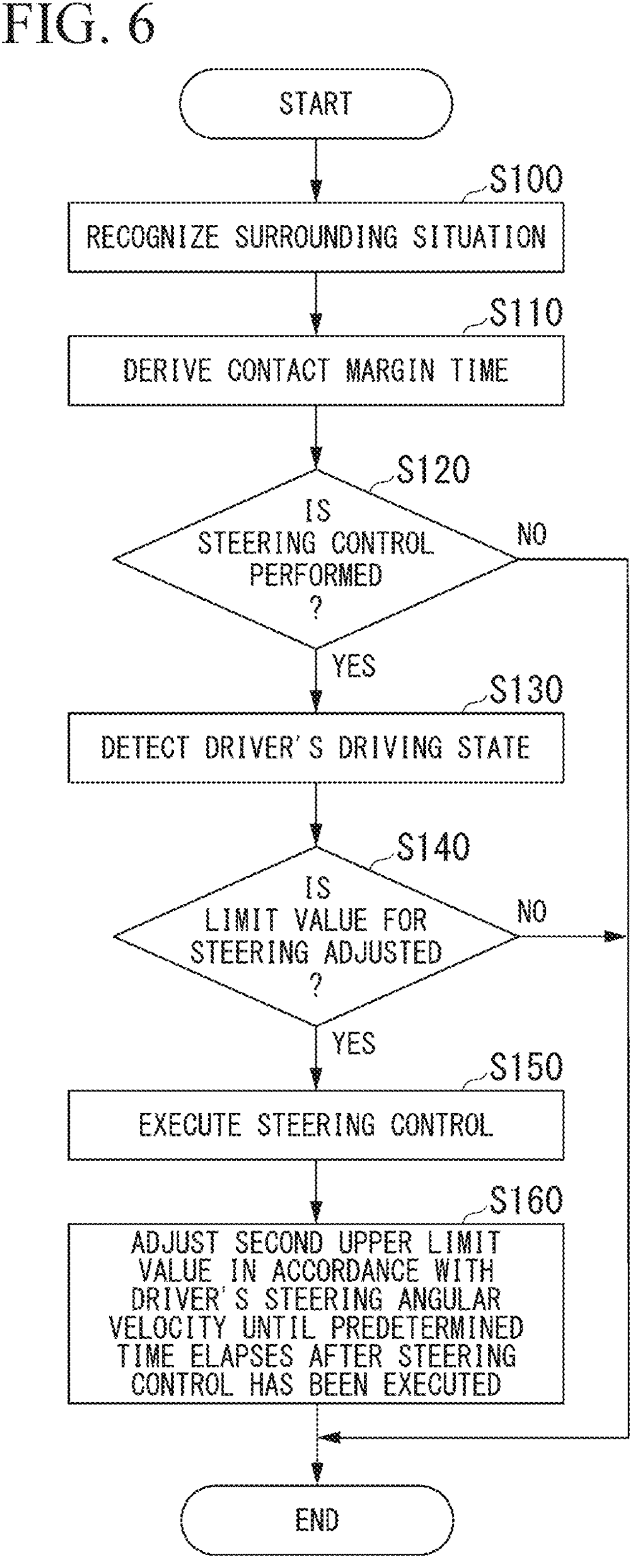
FIG. 6 is a flowchart showing an example of driving control executed by a driving support device.

FIG. 6 is a flowchart showing an example of driving control executed by the driving support device 100. In the example in FIG. 6, the recognizer 110 recognizes the surrounding situation of the host vehicle M (Step S100). Next, the contact probability judger 130 derives the contact margin time TTC between the host vehicle M and an obstacle on the basis of the recognized surrounding situation (Step S110).

Next, the driving controller 140 judges whether or not to perform the steering control for avoiding contact with an obstacle on the basis of the contact margin time TTC (Step S120). When it is judged that the steering control is performed, the limiter 150 detects the driver's driving state by the driving state detector 120 (Step S130) and judges whether or not to adjust the limit value for steering (second upper limit value described above) on the basis of the driving state (Step S140). When it is judged to perform adjustment, the driving controller 140 executes the steering control (Step S150). During the steering control, the limiter 150 adjusts the second upper limit value in accordance with the driver's steering angular velocity until a predetermined time elapses after the steering control has been executed (Step S160). Accordingly, the processing of this flowchart ends. When it is judged that the steering control is not performed in the processing of Step S120, or when it is judged that the limit value for steering is not adjusted in the processing of Step S140, the processing of this flowchart ends.

As described above, according to the embodiment, the driving support device 100 (an example of the vehicle control device) includes the recognizer 110 that recognizes the surrounding situation of the host vehicle M, the driving state detector 120 that detects the driving state including steering of an occupant of the host vehicle M, the driving controller 140 that executes steering control for supporting steering of the occupant when there is a probability that the host vehicle M will come into contact with a surrounding obstacle on the basis of recognition results of the recognizer 110 and steering of the occupant equal to or larger than a predetermined value has been detected by the driving state detector 120, and the limiter 150 that adjusts the limit value related to steering of the occupant in accordance with the steering state of the occupant. Therefore, it is possible to perform more appropriate steering control in accordance with a situation of a vehicle.

For example, there is a probability that necessary lateral movement will not be able to be secured if a limit value for normal steering is used. However, in the embodiment, in the contact avoidance control triggered by driver's steering, it is possible to secure lateral movement necessary for contact avoidance and curb steering more than necessary even if an excessive instruction value is input by adjusting the limit value (limiter) on the basis of the driver's steering. According to the embodiment, since a limit value corresponding to the value of the driver's steering can be set by setting the limit value within a range of the driver's steering, it is possible to secure necessary lateral movement and curb operation beyond expectations of the driver even if an excessive instruction value is input.

According to the embodiment, it is possible to curb mitigation of the limit value more than necessary while necessary lateral movement is secured by performing adjustment of the limit value for only a predetermined time from the driver's steering. According to the embodiment, the limit value is adjusted so as to decrement toward the limit value at normal times with an elapse of time so that necessary lateral movement is secured by causing the upper limit value to increment when execution of the contact avoidance control starts, and the necessary amount of lateral movement decrements with an elapse of time. Therefore, it is possible to curb mitigation of the limit value more than necessary by causing the limit value to decrement as well in response thereto. According to the embodiment, the limit value is adjusted to be set to a time shorter than the contact avoidance control, and therefore it is possible to curb mitigation of the limit value more than necessary.

The numerical values indicated in the embodiment described above are merely examples and may be suitably changed in accordance with the vehicle kind of the host vehicle M, the road situation, the surrounding situation, setting of the developer, or the like.

The embodiment described above can be expressed as follows.

A vehicle control device includes a storage medium which stores computer-readable instructions, and a processor which is connected to the storage medium. The processor executes the computer-readable instructions to: recognize a surrounding situation of a host vehicle, detect a driving state including steering of an occupant of the host vehicle, execute steering control for supporting steering of the occupant when there is a probability that the host vehicle will come into contact with a surrounding obstacle on the basis of recognition results and steering of the occupant equal to or larger than a predetermined value has been detected, and adjust a limit value related to steering of the occupant in accordance with a steering state of the occupant.

Hereinabove, forms for performing the present invention have been described using an embodiment. However, the present invention is not limited to such an embodiment in any way, and various modifications and replacements can be added thereto within a range not departing from the gist of the present invention.

While a preferred embodiment of the invention has been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle control device comprising:

a recognizer that recognizes a surrounding situation of a host vehicle;

a driving state detector that detects a driving state including steering of an occupant of the host vehicle;

a driving controller that executes steering control for supporting steering of the occupant when there is a probability that the host vehicle will come into contact with a surrounding obstacle on the basis of recognition results of the recognizer and steering of the occupant equal to or larger than a predetermined value has been detected by the driving state detector; and a limiter that adjusts limit values related to steering of the occupant in accordance with a steering state of the occupant, wherein the limit values comprise:

a first upper limit value with respect to steering when the steering control is not being performed, and a second upper limit value with respect to steering during the steering control, wherein the driving controller executes steering control such that a steering state during the steering control does not exceed the second upper limit value, and wherein the limiter sets the second upper limit value within a predetermined range from a largest value of a steering state of the occupant detected by the driving state detector.

2. The vehicle control device according to claim 1, wherein the limiter adjusts the second upper limit value until a predetermined time elapses after the steering control has been executed.

3. The vehicle control device according to claim 2, wherein the predetermined time is a time shorter than a time when the steering control is predicted to be executed.

4. The vehicle control device according to claim 1, wherein the limiter causes the adjusted second upper limit value to decrement so as to become close to the first upper limit value with an elapse of time.

5. The vehicle control device according to claim 1, wherein the limiter adjusts the second upper limit value in accordance with a steering state of the occupant when the steering state of the occupant detected by the driving state detector exceeds the first upper limit value.

6. A vehicle control method in which a computer recognizes a surrounding situation of a host vehicle, detects a driving state including steering of an occupant of the host vehicle, executes steering control for supporting steering of the occupant when there is a probability that the host vehicle will come into contact with a surrounding obstacle on the basis of recognition results and steering of the occupant equal to or larger than a predetermined value has been detected, and adjusts limit values related to steering of the occupant in accordance with a steering state of the occupant, wherein the limit values comprise:

a first upper limit value with respect to steering when the steering control is not being performed, and a second upper limit value with respect to steering during the steering control, wherein the executing of steering control comprises executing the steering control such that a steering state during the steering control does not exceed the second upper limit value, and wherein the second upper limit value is within a predetermined range from a largest value of a steering state of the occupant.

7. A computer readable non-transitory storage medium which stores a program causing a computer:

to recognize a surrounding situation of a host vehicle, to detect a driving state including steering of an occupant of the host vehicle, to execute steering control for supporting steering of the occupant when there is a probability that the host vehicle will come into contact with a surrounding obstacle on the basis of recognition results and steering of the occupant equal to or larger than a predetermined value has been detected, and to adjust limit values related to steering of the occupant in accordance with a steering state of the occupant, wherein the limit values comprise:

a first upper limit value with respect to steering when the steering control is not being performed, and a second upper limit value with respect to steering during the steering control, wherein the executing of steering control comprises executing the steering control such that a steering state during the steering control does not exceed the second upper limit value, and wherein the second upper limit value is within a predetermined range from a largest value of a steering state of the occupant.

* * * * *